(12) United States Patent
Yang et al.

(10) Patent No.: US 11,308,658 B2
(45) Date of Patent: Apr. 19, 2022

(54) MOTION ADAPTIVE RENDERING USING VARIABLE RATE SHADING

(71) Applicant: NVIDIA Corporation, Santa Clara, CA (US)

(72) Inventors: Lei Yang, Santa Clara, CA (US); Emmett Michael Kilgariff, San Jose, CA (US); Eric Brian Lum, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/150,585

(22) Filed: Jan. 15, 2021

(65) Prior Publication Data
US 2021/0166441 A1    Jun. 3, 2021

Related U.S. Application Data

(63) Continuation of application No. 16/415,209, filed on May 17, 2019, now Pat. No. 10,930,022.

(Continued)

(51) Int. Cl.
  *G06T 11/00* (2006.01)
  *G06T 15/80* (2011.01)
  (Continued)

(52) U.S. Cl.
  CPC ............ *G06T 11/001* (2013.01); *G06T 5/003* (2013.01); *G06T 7/20* (2013.01); *G06T 7/90* (2017.01);
  (Continued)

(58) Field of Classification Search
  CPC ......... G06T 11/001; G06T 7/90; G06T 5/003; G06T 7/20; G06T 13/20; G06T 13/80;
  (Continued)

(56) References Cited

U.S. PATENT DOCUMENTS

2005/0013494 A1‡  1/2005  Srinivasan ............ H04N 19/86
                                                        382/233
2015/0178983 A1‡  6/2015  Akenine-Moller ..... G06T 15/80
                                                        345/426
(Continued)

OTHER PUBLICATIONS

Yang, L., et al., "Visually Lossless Content and Motion Adaptive Shading in Games," Proc. ACM Comput. Graph. Interact. Tech., vol. 2, No. 1, Article 6, Publication Date May 21, 2019.

(Continued)

*Primary Examiner* — King Y Poon
*Assistant Examiner* — Vincent Peren
(74) *Attorney, Agent, or Firm* — Leydig, Voit & Mayer, Ltd.

(57) ABSTRACT

Motion adaptive shading increases rendering performance for real-time animation in graphics systems while maintaining dynamic image quality. Each frame of an animation is statically displayed within a refresh interval, while a viewer's eyes move continuously relative to the image when actively tracking a moving object being displayed. As a result, a statically displayed frame is essentially smeared across the viewer's continuously moving retina over the lifetime of the frame, causing a perception of blur referred to as an eye-tracking motion blur effect. A region of an image depicting a moving object may be rendered at a lower shading rate because eye-tracking motion blur will substantially mask any blur introduced by reducing the shading rate. Reducing an average shading rate for rendering frames reduces computational effort per frame and may advantageously allow a rendering system to operate at a higher frame rate to provide a smoother, clearer visual experience.

20 Claims, 14 Drawing Sheets

Related U.S. Application Data

(60) Provisional application No. 62/716,497, filed on Aug. 9, 2018.

(51) Int. Cl.

| | | |
|---|---|---|
| *G06T 7/20* | (2017.01) | |
| *G06T 7/90* | (2017.01) | |
| *G06T 5/00* | (2006.01) | |
| *G06T 13/20* | (2011.01) | |
| *G06T 13/80* | (2011.01) | |
| *G06T 15/06* | (2011.01) | |

(52) U.S. Cl.
CPC .............. *G06T 13/20* (2013.01); *G06T 13/80* (2013.01); *G06T 15/06* (2013.01); *G06T 15/80* (2013.01); *G06T 2207/20201* (2013.01)

(58) Field of Classification Search
CPC .................... G06T 15/06; G06T 15/80; G06T 2207/20201
See application file for complete search history.

(56) References Cited

U.S. PATENT DOCUMENTS

| | | | | |
|---|---|---|---|---|
| 2015/0287240 | A1‡ | 10/2015 | Janczak | G06T 15/80 345/522 |
| 2015/0379674 | A1‡ | 12/2015 | Golas | G06T 7/32 345/426 |
| 2015/0379688 | A1‡ | 12/2015 | Cheng | G06T 15/005 345/428 |
| 2016/0284119 | A1‡ | 9/2016 | Surti | G06T 15/005 |
| 2018/0061122 | A1‡ | 3/2018 | Clarberg | G06T 1/20 |
| 2018/0197323 | A1‡ | 7/2018 | Howson | G06T 15/06 |

OTHER PUBLICATIONS

Yang, L., et al., "NVIDIA Adaptive Shading Overview," slideshow from Game Developers Conference, Mar. 18-22, 2019.

U.S. Appl. No. 16/415,209, filed May 17, 2019.

‡ imported from a related application

US 11,308,658 B2

MOTION ADAPTIVE RENDERING USING VARIABLE RATE SHADING

CLAIM OF PRIORITY

This application is a continuation of U.S. patent application Ser. No. 16/415,209 titled "Motion Adaptive Rendering Using Variable Rate Shading," filed May 17, 2019 that claims the benefit of U.S. Provisional Application No. 62/716,497 titled "Motion Adaptive Rendering Using Variable Rate Shading," filed Aug. 9, 2018, the entire contents of both applications are incorporated herein by reference.

TECHNICAL FIELD

The present disclosure relates to real-time graphics rendering, and more particularly to motion adaptive rendering using variable rate shading.

BACKGROUND

Liquid crystal display (LCD) systems and organic light-emitting diode (OLED) display systems are known to introduce an undesirable eye-tracking motion blur effect when displaying motion or animation. The effect is caused by each frame being statically displayed within a refresh interval, whereas a viewer's eyes move continuously relative to the image when actively tracking a moving object being displayed. As a result, a statically displayed frame is essentially smeared across the viewer's continuously moving retina over the lifetime of the frame, causing a perception of blur. The eye-tracking motion blur effect can significantly reduce visual quality at common interactive frame rates of 60 fps, and can be noticeable at 120 fps.

Interactive graphics systems provide finite real-time rendering capacity, forcing a trade-off between static image quality and frame rate. This trade-off space conventionally reduces static image quality at higher frame rates or increases motion blur at lower frame rates. There is a need for addressing these issues and/or other issues associated with the prior art.

SUMMARY

Motion adaptive rendering using variable rate shading (or motion adaptive shading) increases rendering performance for real-time animation in graphics systems while maintaining dynamic image quality. Each frame of an animation is statically displayed within a refresh interval, while a viewer's eyes move continuously relative to the image when actively tracking a moving object being displayed. As a result, a statically displayed frame is essentially smeared across the viewer's continuously moving retina over the lifetime of the frame, causing a perception of blur referred to as an eye-tracking motion blur effect. A region of an image depicting a moving object may be rendered at a lower shading rate because eye-tracking motion blur will substantially mask any blur introduced by reducing the shading rate. Reducing an average shading rate for rendering frames reduces computational effort per frame and may advantageously allow a rendering system to operate at a higher frame rate to provide a smoother, clearer visual experience. Reducing the average shading rate may also allow a rendering system that is not frame rate limited to operate at lower power. Motion adaptive shading applies generally to rendering graphics primitives, including two-dimensional (2D) graphics primitive and three-dimensional (3D) graphics primitives.

A method, computer readable medium, and system are disclosed for motion adaptive rendering, comprising receiving motion data for a region of a frame, calculating a pixel motion value from the motion data, determining a shading rate for the region based on the pixel motion value, and rendering a graphics primitive at the shading rate to produce color data for the region.

A method, computer readable medium, and system are disclosed for content-and-motion adaptive rendering, comprising receiving motion data for a region of a frame, calculating a pixel motion value from the motion data, determining a shading rate for the region based on the pixel motion value and pixel color data from a previously rendered frame, and rendering a graphics primitive at the shading rate to produce color data for the region.

DETAILED DESCRIPTION

Techniques disclosed herein, collectively referred to as motion adaptive shading, increase rendering performance for real-time animation in 2D and 3D graphics systems while maintaining dynamic image quality. A given rendered frame is organized into tiles (regions), and each tile may be rendered according to tile-specific shading rates in one or more dimensions. A shading rate for a tile may be calculated based on motion data (e.g., motion vectors) from pixel flow within the tile (for motion adaptive shading), or on content variation such as luminance and/or color frequency and/or contrast within the tile (for content adaptive shading). Furthermore, the shading rate may be calculated using both pixel flow and content variation. A shading rate refers to a number of shaded color samples per pixel. In an embodiment, for example, a shading rate of two indicates that pixels are oversampled to include two shaded color samples each, while a shading rate of one half indicates that one shaded color sample is applied to two pixels. Shading rate may be directional, such as along X and Y dimensions.

Motion adaptive shading allows rendering systems to overcome conventional trade-off constraints between rendered static image quality and rendered frame rate by selectively reducing shading rates for tiles that depict sufficient motion. A given tile depicting pixel motion above one or more velocity thresholds may be rendered with correspondingly reduced shading rates because eye-tracking motion blur will substantially mask blur introduced by the reduced shading rates within the tile. Reducing an average shading rate for an animated sequence reduces computational effort per frame and may advantageously allow for a higher frame rate. In an embodiment, geometry sampling frequency and/or precision of primitive edges are determined independently from shading rates and are therefore not affected by shading rate.

To reduce potential loss of visual quality, shading rates for each tile are individually calculated such that the entailed reduction of visual detail is primarily masked by perceived blur. In practice, motion adaptive shading produces visual quality similar to ground truth observation. Perceived blur at each tile is caused by eye-tracking motion blur, any motion blur effect computed in a rendering engine, or a combination thereof. When a given frame is rendered, tile shading rates are adaptively calculated for each tile prior to a color shading pass for the frame.

Figure 1A:
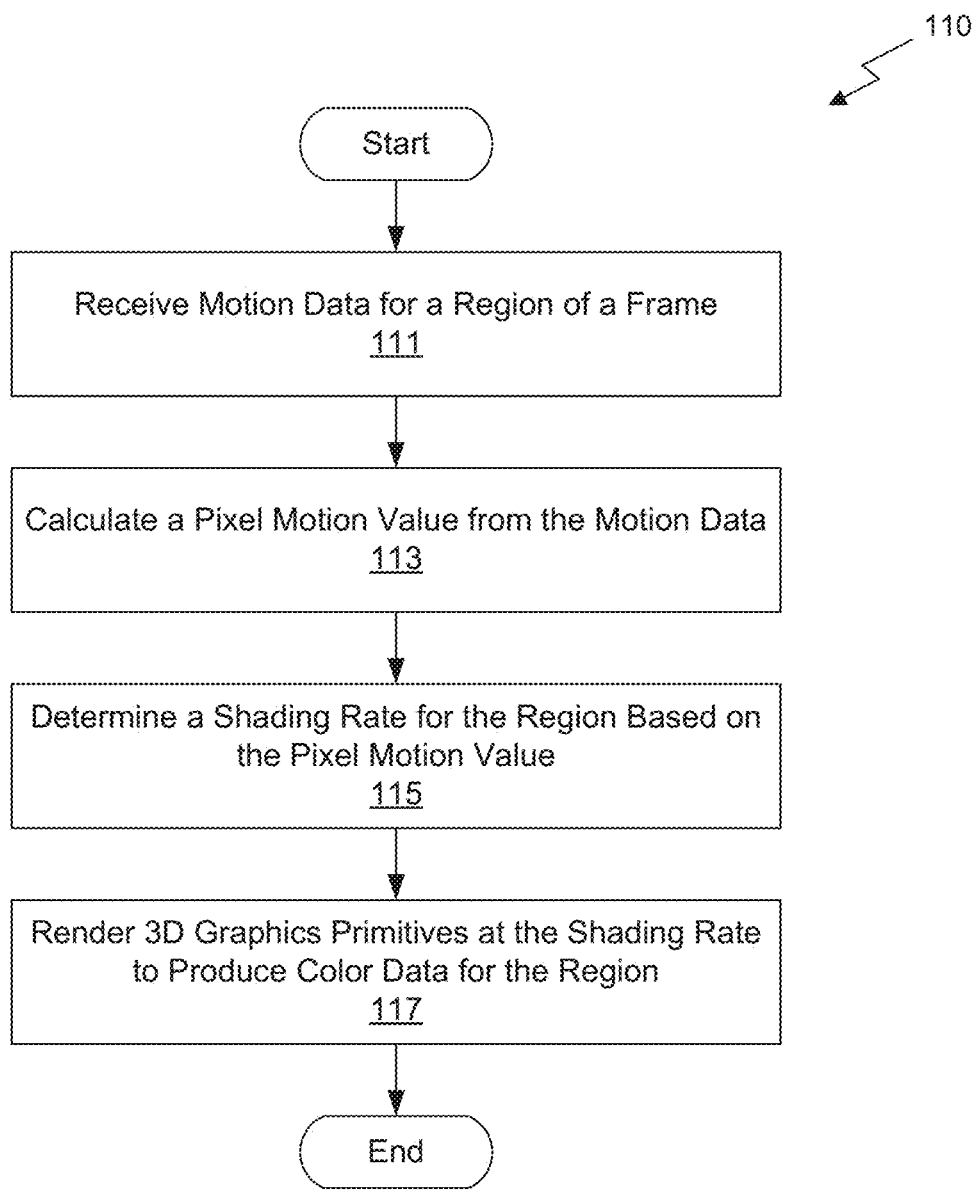
FIG. 1A illustrates a flowchart of a method for motion adaptive rendering, in accordance with an embodiment.

FIG. 1A illustrates a flowchart of a method 110 for motion adaptive rendering (shading), in accordance with an embodiment. Although method 110 is described in the context of a processing unit, the method 110 may also be performed by a program, custom circuitry, or by a combination of custom circuitry and a program. For example, the method 110 may be executed by a GPU (graphics processing unit), CPU (central processing unit), or any processor capable of performing variable rate shading. Furthermore, persons of ordinary skill in the art will understand that any system that performs method 110 is within the scope and spirit of embodiments of the present disclosure.

At step 111, the processing unit receives motion data for a region of a frame. The frame may be one in a sequence of animation frames. In some embodiments, the region may comprise a tile having a fixed or variable size within the frame. In other embodiments, the region may comprise the covered pixels of a geometry primitive, such as a triangle. The motion data may comprise motion vectors for the region. For example, the motion data may include a motion vector for each pixel within the region. In an embodiment, the motion data is calculated according to a camera position change or object position change between an immediately prior frame and the frame. The motion data may be computed using any technically feasible technique(s). Furthermore, the motion data may be computed by the processing unit.

At step 113, the processing unit calculates a pixel motion value from the motion data. In an embodiment, the pixel motion value includes at least one pixel velocity represented in units of pixels (e.g., normalized distance) per frame (e.g., normalized frame time). In an embodiment, pixel velocity may be calculated assuming frame time is constant, although frame time may actually vary depending on rendering effort. In other embodiments, pixel velocity may be calculated to account for rendered frame time. In an embodiment, the motion data comprises an individual motion vector for each pixel within the region, and a given pixel motion value is calculated based on the individual motion vectors. In another embodiment, the motion data comprises a motion vector for each vertex of a geometry primitive within the region.

In certain embodiments, calculating a pixel motion value from the motion data comprises selecting a minimum motion vector value from the individual motion vectors. In other embodiments, different techniques may be implemented to calculate a pixel motion value for the region. For example, in an embodiment, a pixel motion value may be calculated to be an average, median, or mode value from the individual motion vectors. In another embodiment, a pixel motion value may be calculated as a specified percentile velocity of the individual motion vectors.

In an embodiment, independent pixel motion values are calculated per display dimension. In such an embodiment, a pixel motion value is calculated along an X (horizontal) dimension and, separately a pixel motion value is calculated along a Y (vertical) dimension. For example, a pixel motion value for the X dimension may be calculated as a minimum component value from all X components of the individual motion vectors; and a pixel motion value for the Y dimension may be calculated as a minimum value from all Y components of the individual motion vectors.

At step 115, the processing unit determines a shading rate for the region based on the pixel motion value. Any technically feasible technique may be performed to determine the shading rate. In an embodiment, the shading rate specifies a value of one (i.e. one shaded sample per pixel), one half (i.e., one shaded sample per two pixels), or one quarter (i.e., one shaded sample per four pixels). In other embodiments, different or additional shading rates may be specified. Furthermore, a shading rate may be calculated for each dimension.

In an embodiment, a first velocity threshold (V2) and a second velocity threshold (V4) are defined where V2 is less than V4. When a pixel motion value along the X dimension is calculated to be equal to or below the first velocity threshold, the shading rate along the X dimension is determined to be one. When the pixel motion value is above the first velocity threshold but equal to or below the second velocity threshold, the shading rate along the X dimension is determined to be one half (i.e. half-rate shading). When the pixel motion value is above the second velocity threshold, the shading rate along the X dimension is determined to be one quarter (i.e. quarter-rate shading). Furthermore, shading rates along the Y dimension may be similarly calculated.

In an embodiment, each region comprises a tile, and each tile may be further organized into pixel blocks. An exemplary tile may comprise a 16×16 set of pixels having a pixel block size of 1×1, 1×2, 2×1, 1×4, 4×1, 2×4, 4×2, or 4×4 pixels. Pixel block size may be determined based on shading rates for the tile. Shading rate along each dimension determines a pixel block size. For example, if a particular tile is determined to have a shading rate of one half in the vertical dimension and one quarter in the horizontal dimension, then a 2×4 pixel block size may be used.

In an embodiment, a region is covered at least partially by a geometry primitive such as a triangle. The processing unit may rasterize the primitive into individual pixels according to geometric coverage of the primitive, but shading of the individual pixels may proceed according to pixel block sizes of 1×1, 1×2, 2×1, 1×4, 4×1, 2×4, 4×2, or 4×4 pixels. In such an embodiment, each pixel in a particular pixel block is assigned the same shading result.

At step 117, the processing unit renders 3D graphics primitives at the shading rate to produce color data for the region. Any technically feasible technique may be performed to render the 3D graphics primitives, including pixel shading in a forward or deferred rendering pipeline, screen-space rendering using compute shaders, ray tracing, and/or decoupled shading. A shading operation may include, without limitation, generating and combining one or more samples, such as texture mapping samples, sub-pixel samples, or ray trace samples.

In an embodiment, method 110 is performed on a first tile to determine a first shading rate(s) for the first tile, and method 110 is subsequently performed on a second, adjacent tile to determine a second shading rate(s) for the second tile. In certain embodiments, the first shading rate and the second shading rate are limited to a maximum shading rate difference. In an embodiment, the maximum shading rate difference may be specified as one list position difference from a list of possible shading rates (e.g., one, one half, one quarter, and so forth). For example, if the first shading rate is determine to be one, then the second shading rate may be either one or one half, but not one quarter (list position difference of two).

In certain embodiments, the processing unit includes hardware subsystems configured to perform variable rate shading at one or more positions within a rendering pipeline. In an embodiment, the processing unit is configured to execute shaders that perform variable rate shading, with a shading rate specified individually for each tile or each primitive.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
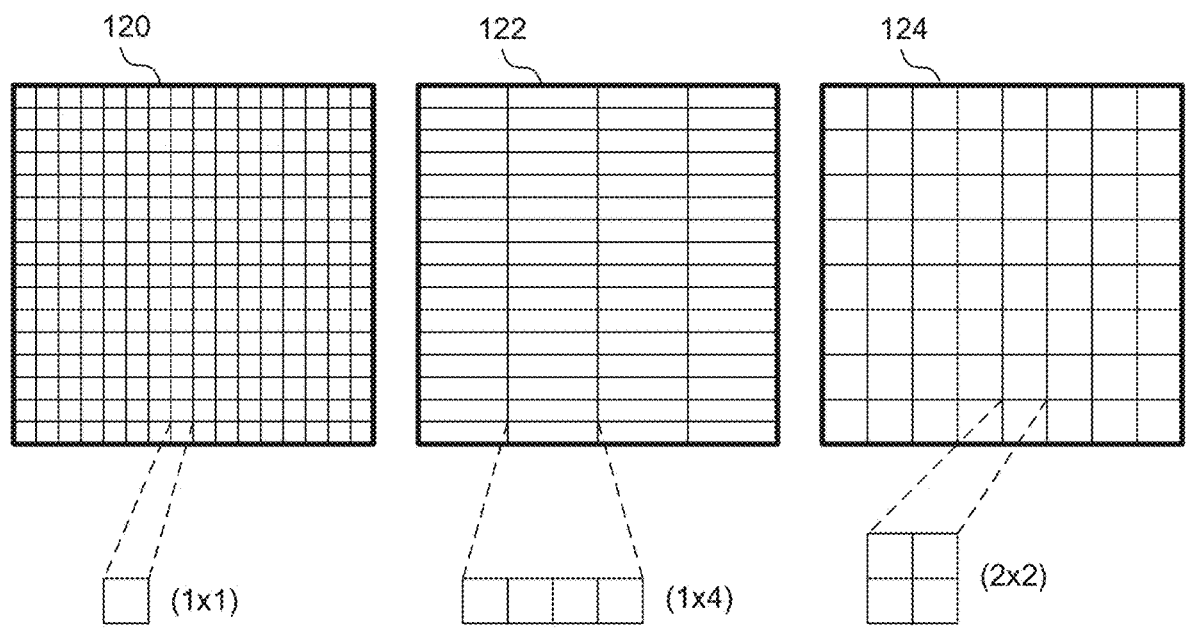
FIG. 1B illustrates different pixel block sizes for different tiles, in accordance with an embodiment.

FIG. 1B illustrates different pixel block sizes for different tiles 120, 122, 124, in accordance with an embodiment. As shown, tile 120 has a pixel block size of one pixel, tile 122 has a pixel block size of 1×4 pixels, and tile 124 has a pixel block size of 2×2 pixels. Additional pixel block sizes may also be specified, potentially up to the size of the tile. In an embodiment, pixel block sizes include 1×1, 1×2, 1×4, 2×1, 2×2, 2×4, 4×1, 4×2, and 4×4 within a 16×16 tile. Of course, different tile sizes and different pixel block sizes may be implemented instead without departing the scope and spirit of various embodiments.

In an embodiment, a pixel block size of 1×1 includes one pixel and is shaded from at least one color shading operation. A pixel block of 4×4 pixels comprises sixteen pixels, which are collectively shaded from one color shading operation, thereby reducing computational workload relative to a 1×1 pixel block. Furthermore, a 16×16 tile comprising 4×4 pixel blocks only requires sixteen shading operations rather than two-hundred fifty-six color shading operations.

Figure 1C:
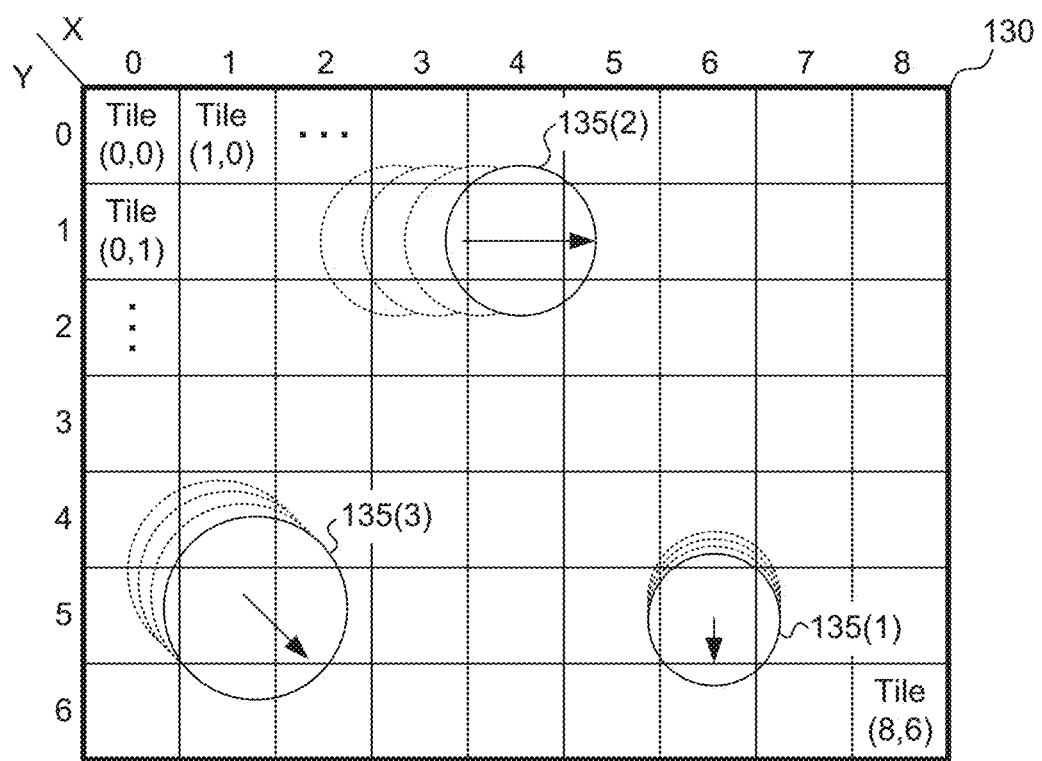
FIG. 1C illustrates a rendered frame depicting animated objects, in accordance with an embodiment.

FIG. 1C illustrates a rendered frame 130 depicting animated objects 135, in accordance with an embodiment. As shown, the rendered frame 130 comprises a grid of adjacent square tiles organized along X and Y dimensions. For example, a Tile(0,0) is located at X=0, Y=0, and so forth. Each animated object 135(1), 135(2), 135(3) is shown moving at a different velocity and direction, with sequential frame-to-frame movement depicted as trailing dashed impressions, and velocity depicted as an associated arrow having direction and magnitude. As shown, animated object 135(1) is moving slowly along the Y (vertical) dimension, animated object 135(2) is moving quickly along the X (horizontal) dimension, and animated object 135(3) is moving diagonally along the X and Y dimensions. Each different animated object 135 may be perceived as having varying degree of eye-tracking motion blur, with faster-moving objects having more eye-tracking motion blur.

In an exemplary real-time frame sequence, velocity threshold V2 is set at three pixels per frame and velocity threshold V4 is set at six pixels per frame. Animated object 135(1) may be traveling at a screen space velocity of one pixel per frame along the Y dimension (less than V2) and zero pixels per frame along the X dimension (less than V2); consequently a shading rate for associated tiles (e.g. covered tiles) would be determined to be one in both X and Y dimensions, and shading would be performed on 1×1 pixel blocks within the associated tiles. Additionally, animated object 135(2) may be traveling at a screen space velocity of seven pixels per frame along the X dimension (greater than V4) and zero pixels per frame along the Y dimension (less than V2); consequently a shading rate for associated tiles would be determined to be one quarter in the X dimension and one in the Y dimension, and shading would be performed on 1×4 pixel blocks within the associated tiles. Finally, animated object 135(3) may be traveling at four pixels per frame in both X and Y dimensions (between V2 and V4); consequently a shading rate for associated tiles would be determined to be one half in each dimension and shading would be performed on 2×2 pixel blocks within the associated tiles.

In an embodiment, a processing unit is configured to generate the rendered frame 130 by performing techniques disclosed herein, including method 110 of FIG. 1A, to reduce overall shading computation associated with generating the rendered frame 130. More specifically, shading rates for each tile may be reduced according to motion within the tile, such that a shading rate reduction is substantially masked by inherent eye-tracking motion blur for the tile. In the present example, a tile at location (4,1) may be shaded at a reduced shading rate along the X dimension because animated object 135(2) covers all pixels in the tile and has a high pixel velocity. If the velocity of animated object 135(2) is above the first velocity threshold (e.g., V2 exceeds three pixels/frame), then pixels within the tile at location (4,1) may be shaded with a reduced shading rate of one half. If the velocity is above the second velocity threshold (e.g., V4 exceeds six pixels/frame), then a shading rate of one quarter may be used.

Similarly, a tile at location (1,5) may be shaded at reduced shading rates along both X and Y dimensions because animated object 135(3) covers all pixel in the tile and has moderate pixel velocity and both X and Y. Selectively reducing shading rates in this way creates a broader tradeoff space between static shaded resolution per frame and frame rate, allowing systems to achieve better overall visual quality. In an embodiment, pixels in a given tile are rendered according to a shading rate(s) for the tile. In another embodiment, pixels associated with a given primitive (e.g., comprising an object) are rendered according to a shading rate for the primitive.

Figure 1D:
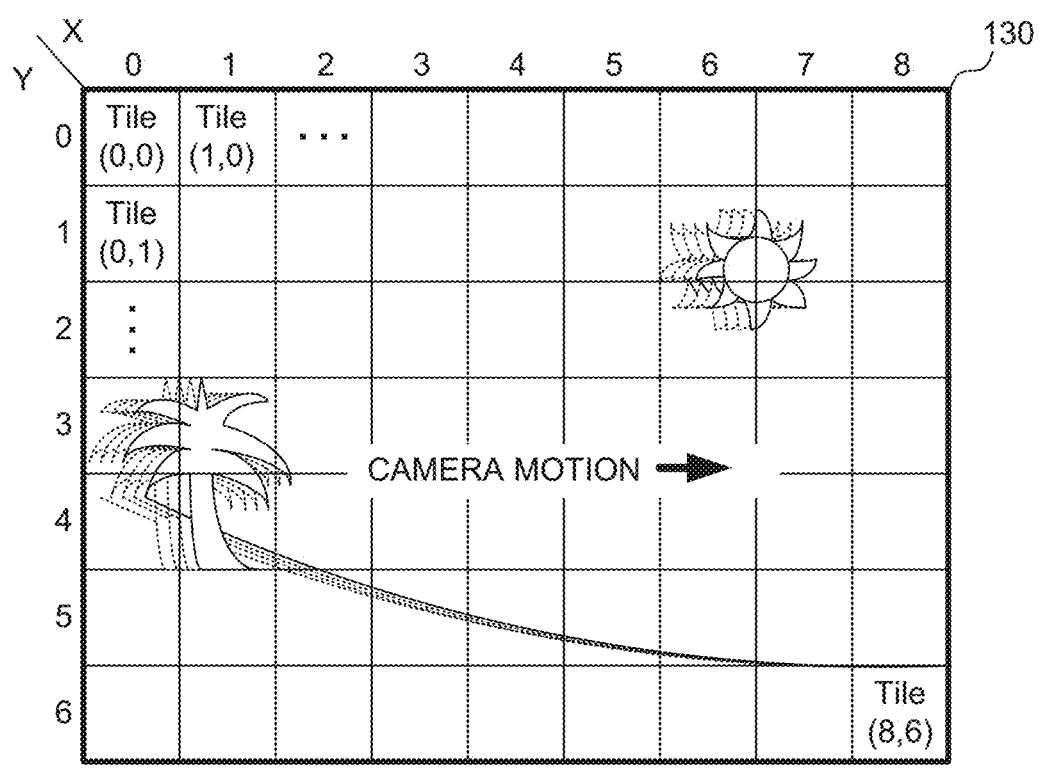
FIG. 1D illustrates a rendered frame depicting camera motion, in accordance with an embodiment.

FIG. 1D illustrates a rendered frame 130 depicting camera motion, in accordance with an embodiment. As shown, a camera is panning in a left to right motion, resulting in pixel motion throughout the frame 130, with different pixels within the frame 130 potentially subject to different pixel motion. In an embodiment, motion vectors for pixels within the frame 130 are computed based on differences between camera position at the current frame and a previous frame along with depth map values for the current frame. In an embodiment, a shader is configured to compute world-space positions for each pixel based on a corresponding depth value and a view-projection matrix. The world-space positions can be transformed based on a previous view-projection matrix of a previous frame to produce a viewport location in the previous frame of a scene geometry element that is now at a given pixel in the current frame. A velocity vector for a given pixel can be calculated as a difference in viewport position of the geometry between the current frame (at the pixel) and the previous frame. While this technique accounts for pixel velocity of stationary objects, pixel velocity values do not necessarily capture pixel velocity of objects moving in real-time through world-space.

Any region of the frame 130 may be subject to eye-tracking motion blur. When the camera is panning sufficiently quickly, most or all tiles within the frame 130 may be eligible for reduced shading rates, thereby allowing for higher frame rates and smoother, clearer perceived motion.

Figure 1E:
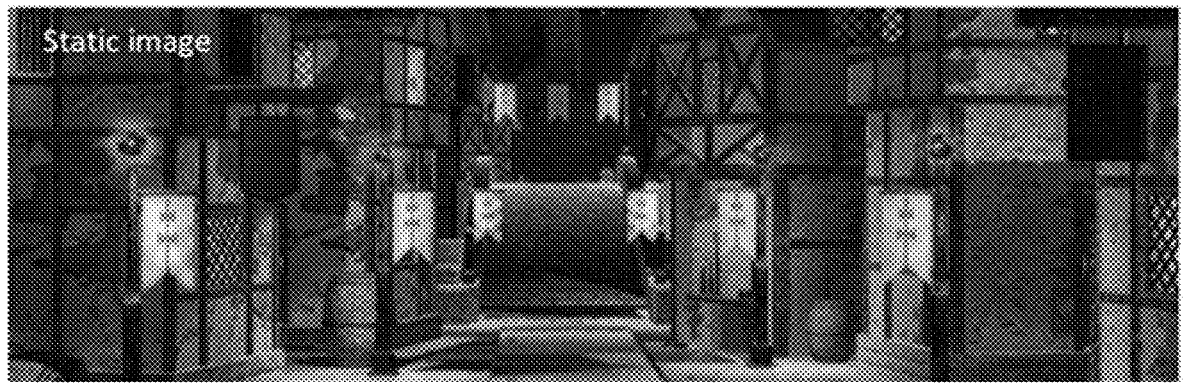
FIG. 1E illustrates a rendered static image from a graphics scene, in accordance with an embodiment.

FIG. 1E illustrates a rendered static image from a graphics scene, in accordance with an embodiment. The static image represents the highest visual quality for an exemplary rendering platform.

Figure 1F:
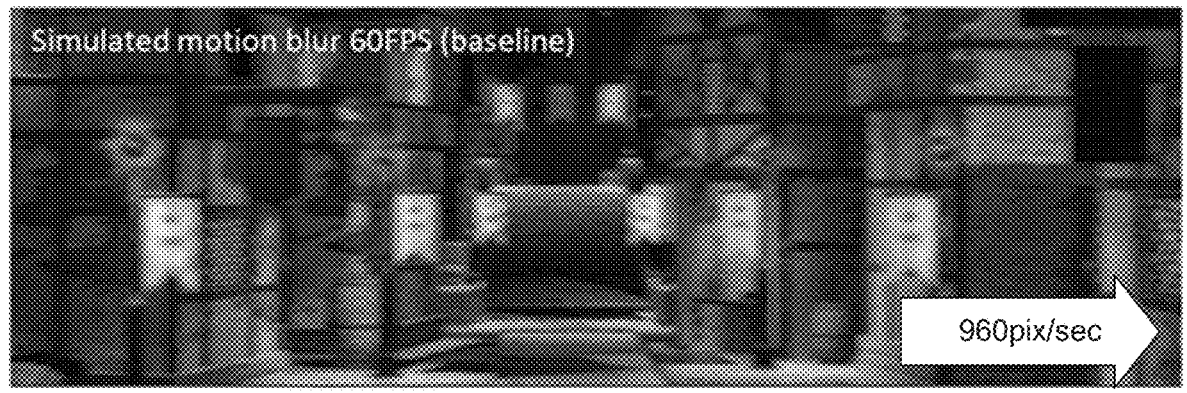
FIG. 1F illustrates a rendered image of a graphics scene with simulated eye-tracking motion blur at 60 frames per second refresh rate, in accordance with an embodiment.

FIG. 1F illustrates a rendered image of a graphics scene with simulated eye-tracking motion blur at 60 frames per second (FPS) refresh rate, in accordance with an embodiment. This image may be considered a baseline as 60 FPS displays are in common use in relevant real-time animation applications. Note that significant blurring may be seen along the X dimension due to camera panning along the X dimension.

Figure 1G:
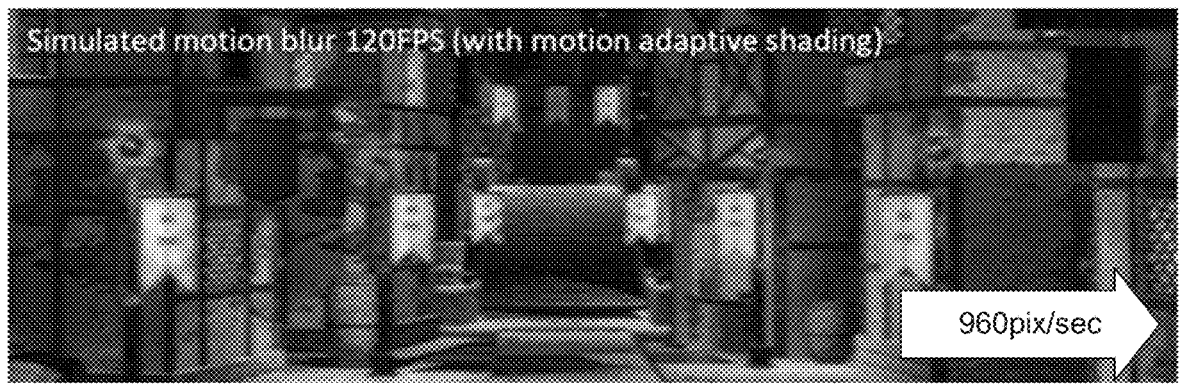
FIG. 1G illustrates a rendered image of a graphics scene with simulated eye-tracking motion blur at 120 frames per second refresh rate using motion adaptive shading to reduce shading effort, in accordance with an embodiment.

FIG. 1G illustrates a rendered image of a graphics scene with simulated eye-tracking motion blur at 120 FPS refresh rate using motion adaptive shading to reduce shading effort, in accordance with an embodiment. As shown, a significantly less blurry image is produced at 120 FPS, a frame rate that may be achieved using motion adaptive shading to reduce color shading effort on the rendering platform. The rendering platform could not otherwise achieve 120 FPS.

Figure 1H:
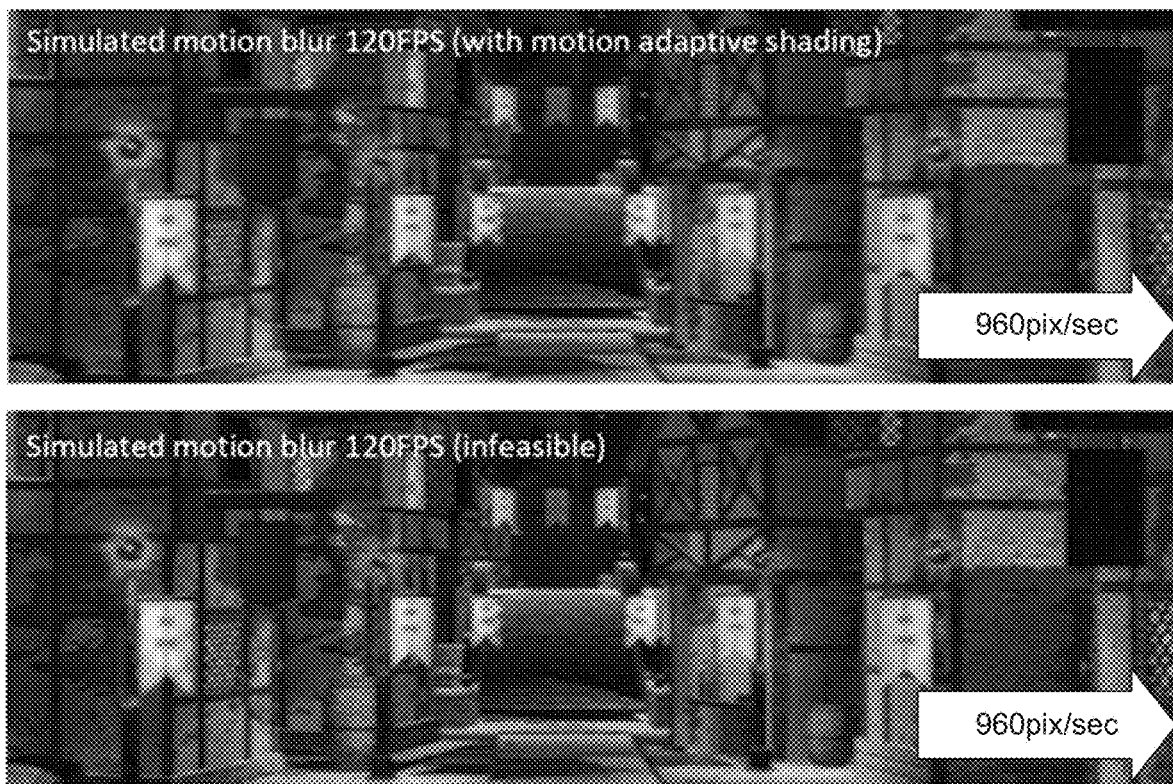
FIG. 1H illustrates a comparison between motion adaptive shading and conventional rendering using full shading effort, in accordance with an embodiment.

FIG. 1H illustrates a comparison between motion adaptive shading and conventional rendering using full shading effort, in accordance with an embodiment. As shown, motion adaptive shading produces similar visual quality relative to shading performed with no shading rate reductions. However, the rendering platform is actually able to operate at 120 FPS using motion adaptive shading, whereas the same platform could not otherwise achieve 120 FPS using conventional techniques.

From the perspective of frequency domain signal analysis, eye-tracking motion blur is substantially equivalent to applying a first low-pass filter that is directional and oriented along the motion direction of a moving object (or frame region) being visually tracked. This first low-pass filter attenuates certain details in a visual signal having frequency content higher than a certain passing threshold (e.g., assuming an ideal low-pass filter). At the same time, reducing shading rate along the same direction also reduces high-frequency details in the signal (a second low pass filter applied to the same visual information). Therefore, when the passing threshold frequency associated with shading rate reduction (second low-pass filter) is higher than the passing threshold frequency associated with eye-tracking motion blur (first low-pass filter), the effect of shading rate reduction can be essentially masked (hidden). In practice, masking of a shading rate reduction is guaranteed by first determining the amount of eye-tracking motion blur for a given screen-space speed for rendered contents (e.g., animated objects 135, camera movement, etc.), and then applying a safe ratio of a shading rate reduction that can be masked by eye-tracking motion blur. In an embodiment, a first safe ratio is specified as a rate reduction of one half when pixel velocity is above approximately three pixels per frame; a second safe ratio is specified as a rate reduction of one quarter when pixel velocity is above approximately six pixels per frame.

Furthermore, slightly different velocity thresholds V2+ and V2− (or V4+ and V4−) may be directionally applied, such that when increasing a shading rate for a given tile in a subsequent frame, V2+ and V4+ may be used; and, when decreasing a shading rate for the tile in the subsequent frame, V2− and V4− may be used. Using directionally applied velocity thresholds provides hysteresis and may generally avoid unnecessarily rapid alternation between shading rates, which may be perceived by a viewer as undesirable visual artifacts. In this way, adding hysteresis may act as a damping function to avoid rapid oscillations or spikes in shading rate on the same tile or on a moving object.

In an embodiment, adjacent tiles are constrained to differ by one or less increments (one, one half, one quarter) of shading rate. In such an embodiment, a tile shading rate that is otherwise eligible to be reduced to be one quarter is only allowed to be reduced to one half when adjacent to a tile with a shading rate of one. In this way, a first shading rate for a first tile and a second shading rate for a second (adjacent) tile are limited to a maximum shading rate difference. Limiting shading rate differences for adjacent tiles serves to reduce or eliminate sharp changes in blur that can be perceived as undesirable visual artifacts.

The presently disclosed technique may be extended to support multiple shading operations per pixel, to effectively super sample a pixel shading result. In such an embodiment, additional velocity thresholds $V\frac{1}{2}$, $V\frac{1}{4}$, etc. may be defined to trigger shading rates of 2×, 4×, etc. samples per-pixel (super sampling). Super sampling may increase temporal stability and reduce aliasing artifacts appearing on high-frequency details. A higher per-pixel shading rate may provide additional detail and perceived image quality at lower object motion speeds, as aliasing artifacts are more easily noticeable at lower speeds. Such super sampled shading may be implemented in various shading pipelines.

Screen-space motion speed may be measured in units of pixels/frame. Similarly, width of blur caused by eye-tracking motion blur may be quantified in units of pixels/frame. Consequently, the same set of velocity thresholds can be used regardless of actual rendering frame rate and/or display system refresh rate. However, in systems with a highly variable frame rates, each frame may show a very different motion speed (pixels/frame). Such variability may cause the shading rate pattern to vary dramatically across neighboring frames, resulting in temporal instability of shading rates. Therefore, in certain embodiments, a temporal smoothing scaler may be applied to generate adaptive velocity thresholds ($\overline{V_k}$) based on predefined velocity thresholds ($V_k$, where k is either 2 or 4, and additionally ½ or ¼ if adaptive super sampling is employed). In an embodiment, a smoothing scaler may be defined as: $\overline{V_k} = V_k \cdot t / \bar{t}_N$, wherein t is elapsed time of a current frame (e.g., used to update camera and dynamic motion), and $\bar{t}_N$ is an average elapsed time of the past N frames. This smoothing scaler may effectively compensate for the camera motion variation caused by individual frame time variation.

In an embodiment, a post-processing pass may be applied to attenuate (or eliminate) certain artifacts caused by varying shading rates for different tiles. Such artifacts may include a transiently blocky appearance and/or temporal instability when motion speeds change. In an embodiment, the industry standard Temporal Anti-Aliasing (TAA) technique may be applied for the post-processing pass to serve as a damping function for shading rate changes based on shading rates from at least two immediately prior frames. Furthermore, TAA may be adapted to quickly refresh an accumulated history result after a shading rate change (e.g., shading rate spikes up), to avoid retaining blurry results after a camera stops moving. Specifically, the weight of the current frame in the exponential averaging temporal filter used in TAA is increased to a predefined value whenever the shading rate in any direction is increased in a screen tile. This ensures that the displayed result is immediately updated to a clear image (full shading rate) when any blurry appearance can no longer be masked by motion.

In an alternative embodiment, (e.g., when TAA is not implemented), an adaptive de-blocking filter may be used to smooth visible boundaries between pixel blocks. The adaptive de-blocking filter may receive shading rates used in each screen tile as inputs, and may apply smoothing only to known shading pixel block or tile boundaries, rather than all discontinuities in the image.

In an embodiment, motion vectors comprising the motion data are stored in a screen-mapped texture. The motion vectors may be generated by a rendering engine as one of various outputs, for example of a forward rendering pass (or passes). In certain embodiments, the motion vectors are used as inputs for post processing passes, such as TAA and/or motion blur effects. In an embodiment, the motion vectors are generated for a first frame, along with pixel color information for the first frame. A rendering pass for a subsequent second frame then uses the motion vectors generated with the first frame to determine shading rates for the second frame. Sequential frames may be similarly generated. In general, techniques that compute motion from previously rendered frame(s) may introduce at least a frame of lag in shading rate decisions for a current frame, as the estimated motion within a given tile is based on previously rendered information for a previous frame or frames.

In various embodiments, lag associated with shading rate decisions may be avoided by computing motion vectors based on previous and current camera view positions (e.g., as specified in model view projection matrices) of each pixel, along with a rendered depth buffer of the current frame, which is commonly generated at the beginning of the frame by a depth-only pass. Persons of ordinary skill in the art will recognize that camera motion from a previous view to a current view for the current frame (e.g., camera transform matrix), along with depth at a given pixel are sufficient to calculate pixel velocity for the current frame at the pixel. This approach provides quick shading rate adaptation to sudden camera movements, however this approach does not account for dynamically moving objects. In some embodiments, this approach is used together with the motion vectors obtained from the previous frame to jointly estimate the motion data.

In an embodiment, the motion data is calculated according to optical flow of color image data between two frames rendered immediately prior to the frame, with motion vectors calculated for each pixel in the frame based on movement detected between the prior two frames. Any technically feasible technique may be performed, including well-known technique for motion estimation in sequential images. In certain embodiments, hardware-assisted motion estimation circuitry may provide motion estimates as the basis for pixel motion vectors.

In another embodiment, directional spectral filters are applied to frame data, such as color data or resulting data from certain visual effect passes (e.g., depth of field or motion blur effects). When filtered outputs indicate a given tile contains little or no high-frequency energy, the velocity thresholds (e.g., V2 in X and Y, V4 in X and Y) may be adjusted lower. Reducing shading rate(s) for a tile with minimal high-frequency energy typically results in negligible loss of visual quality.

The presently disclosed techniques for shading rate reduction may be advantageously applied to different shading schemes, including pixel shading in rasterization pipelines, shading in screen-space compute shaders, pixel shading using ray tracing, and decoupled shading pipelines.

In an embodiment, color shading is performed in rasterization pipeline. In certain embodiments, native variable rate shading (VRS) may be provided by the rasterization pipeline hardware circuits. The variable rate shading hardware feature may provide for per-screen tile (16×16 pixel) determination or per-primitive determination of pixel shading rates in forward rendering and full-screen pixel-shading passes. A list of shading rates supported by the variable rate shading feature may be provided, and a shading rate from the list of shading rates can be specified for each tile or each triangle primitive.

In another embodiment, color shading is performed by screen-space compute shaders, with per tile shading rate implemented within the compute shaders. In an exemplary shader, each 16×16 tile of pixels can be shaded at a desired frequency, e.g. once per 2×2 pixel block, and then the result of each block can be written to all relevant pixels in the output surface. A compute shader allows for a flexible mapping between compute threads and output pixels. Such a mapping may be determined at (shader) run time, based on the shading rate used in each screen region, each frame. This approach is referred to as variable rate compute shading (VRCS). Furthermore, more or fewer threads may be launched to shade a given tile, according to a shading rate for the tile. In such an embodiment, shading rate determines a number of shading operations per pixel within the region.

In yet another embodiment, color shading is performed in a ray tracing pipeline. In a ray tracing pipeline, a pixel color is determined by casting one or more primary rays and shading at the intersections of rays and scene geometry. Optionally, secondary rays are also cast and shaded to support shadows and single/multiple bounce shading effects. The number of primary and secondary rays per pixel can be adjusted easily based on shading model and quality requirements, effectively changing the shading rate per pixel. Optionally, the ray density can drop below 1 ray per pixel ratio, and resulting pixels in the image are reconstructed using spatiotemporal reconstruction filters and interpolation from the sparsely computed shades. In such an embodiment, shading rate determines a number of rays cast per pixel within the region.

In yet another embodiment, color shading is performed by one or more decoupled shading pipelines. In a decoupled shading pipeline, a shading rate may be decoupled from a visibility sampling rate through any technically feasible adaptive on-demand texture-space shading technique. Variable pixel shading rate is therefore naturally supported by varying the shading resolution in texture MIP-level. Since this form of shading rate can be determined on a per texture-tile basis, there is enough flexibility to vary shading rate adaptively at each visible surface location and respond to a shading rate determination based on screen-space motion. In such an embodiment, shading rate determines a texture MIP-level rendered into a texture on a per texture-tile basis.

Figure 2:
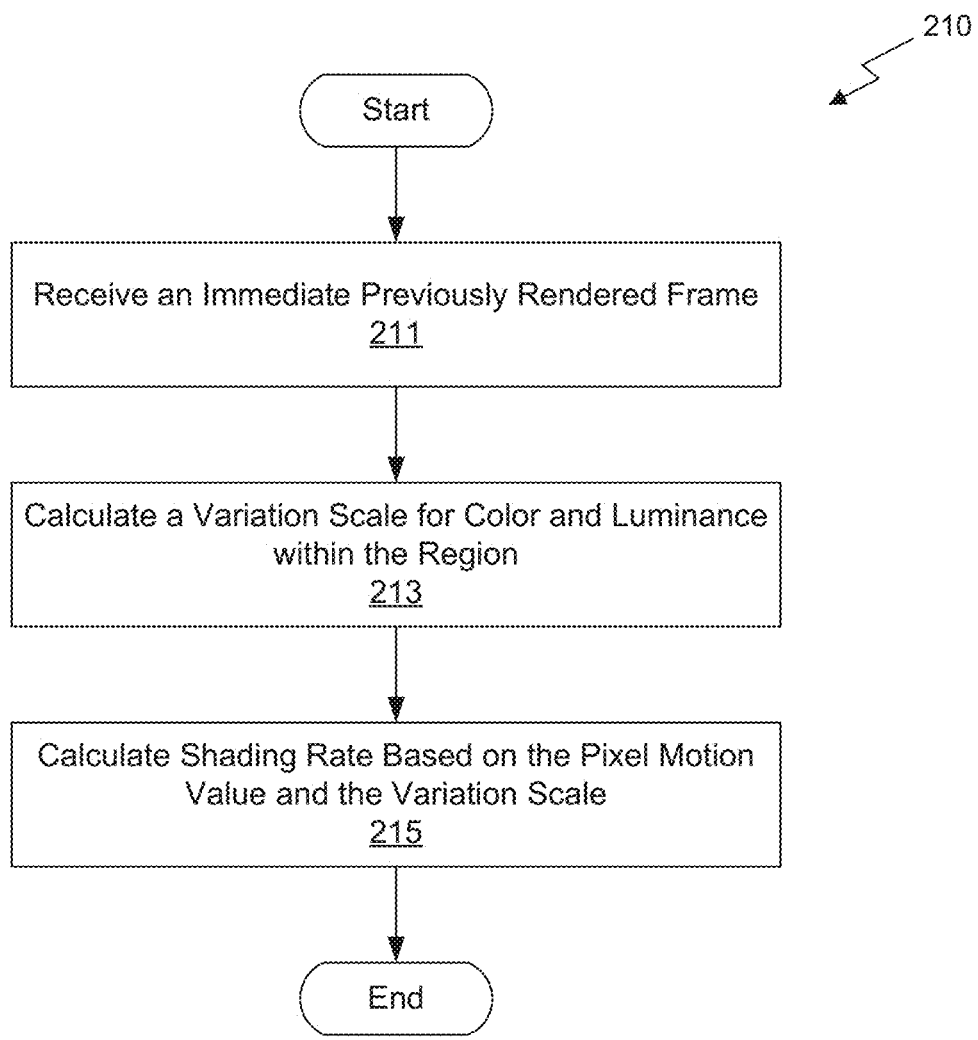
FIG. 2 illustrates a flowchart of a method for determining a shading rate by jointly considering content variation and motion, in accordance with an embodiment.

FIG. 2 illustrates a flowchart of a method 210 for determining a shading rate by jointly considering content variation and motion, in accordance with an embodiment. The method combines and unifies the principles of content adaptive shading and motion adaptive shading. Although method 210 is described in the context of a processing unit, the method 210 may also be performed by a program, custom circuitry, or by a combination of custom circuitry and a program. For example, the method 210 may be executed by a GPU (graphics processing unit), CPU (central processing unit), or any processor capable of performing variable rate shading. Furthermore, persons of ordinary skill in the art will understand that any system that performs method 210 is within the scope and spirit of embodiments of the present disclosure.

At step 211, the processing unit receives an immediate previously rendered frame, which may include rendered color information. In an embodiment, immediate previously rendered frame may be generated by the processing unit. At step 213, the processing unit calculates a variation scale for color and luminance within the region. Any technically feasible technique may be applied to specify and calculate a variation scale. The content variation scale may be calculated independently per X and Y dimensions of the image. At step 215, the processing unit calculates shading rate based on the pixel motion value and the variation scale.

In an embodiment, a shading rate is calculated according to an extent of content variation within each tile. Tiles without high frequency and/or high contrast content variation may reduce shading rate at a lower velocity threshold without causing perceived loss in quality. In an embodiment, a shading rate calculation provides for adjusting a velocity threshold (e.g., V2, V4) based on estimated color and luminance variation within the tiles. Tiles with less high frequency details or less color and luminance variations may use lower velocity thresholds. In another embodiment, the shading rate calculation computes an estimated average pixel value difference (i.e. loss) between full shading rate and reduced shading rate in each tile given both the tile content and minimum motion speed, and provides for a reduced shading rate if such a loss is lower than a predefined quality level (e.g., just-noticeable difference threshold). Similar to the distinction between V2 and V4, a first difference threshold D2 may be defined that guards the transition between full-rate shading and half-rate shading, and a second difference threshold D4 may be defined that guards the transition between half-rate shading and quarter-rate shading.

In an embodiment, the shading rate is calculated to decrease as the pixel motion value exceeds each of two or more velocity thresholds, and the velocity thresholds vary as a function of the variation scale. In another embodiment, the shading rate is calculated to decrease when the variation scale is below a threshold (i.e. D2 or D4), and the threshold varies as a function of a pixel motion velocity. In the special case when pixel motion velocity is zero (static scene or object), the shading rate calculation can be demoted to pure content adaptive shading, where shading rate is solely determined based on the variation scale. In such a case, the threshold (D2 or D4) signifies the variation scale at which the visual difference caused by lowering the shading rate is just noticeable to the viewer. In the more general case when pixel velocity greater than zero, the threshold (D2 or D4) signifies the just noticeable difference at shading rate transition with motion present. More generally, faster motion results in higher thresholds D2 and D4.

In an embodiment, the variation scale is calculated as the mean of absolute differences between neighboring pixels in a region in a given direction (X or Y). The mean can be a regular arithmetic mean or a Minkowski mean. In one embodiment, the same variation scale is used determine a transition between full-rate and half-rate shading (i.e. with threshold D2), and a transition between half-rate and quarter-rate shading (i.e. with threshold D4). In another embodiment, different variation scales are computed for each transition decision. Furthermore, the variation scale may be re-projected to a frame to be subsequently shaded using motion data.

Although the method 110 and related techniques are described in the context of processing units, any program, custom circuitry, or a combination of custom circuitry and a program may be configured to perform the techniques. For example, motion adaptive shading techniques may be implemented by a GPU (graphics processing unit), CPU (central processing unit) or a parallel processing unit, such as parallel processing unit 300 of FIG. 3. Furthermore, persons of ordinary skill in the art will understand that any system that performs the operations of the method 110 and related methods and techniques are within the scope and spirit of embodiments of the present disclosure.

The disclosed techniques overcome conventional tradeoff constraints between rendered frame quality and rendered frame rate by reducing shading rates for tiles that depict motion sufficient to be perceived in reduced detail (e.g., blurry, lower resolution) by the human visual system. To reduce loss of visual quality, shading rates are calculated such that the entailed reduction of visual detail is substantially masked by perceived blur, and the visual quality is similar to ground truth observation. The perceived blur is caused by motion displayed on a persistent sample-and-hold display, a motion blur effect computed in a rendering engine, or a combination of both. When a given frame is rendered, the individual tile shading rates are adapted based on scene motion at the tiles or primitives. In other words, the frame is rendered using variable rate shading.

In an embodiment, shading rate may be computed by additionally taking into account the extent of content variation within each tile. Tiles without high frequency content variation may be rendered at a reduced shading rate at a lower motion threshold without causing perceived loss in quality. The disclosed techniques may be implemented in the context of different shading schemes, any of which may adaptively reduce shading rates throughout a rendered frame to advantageously improve rendering frame rate or reduce computational effort at a specified frame rate.

Parallel Processing Architecture

Figure 3:
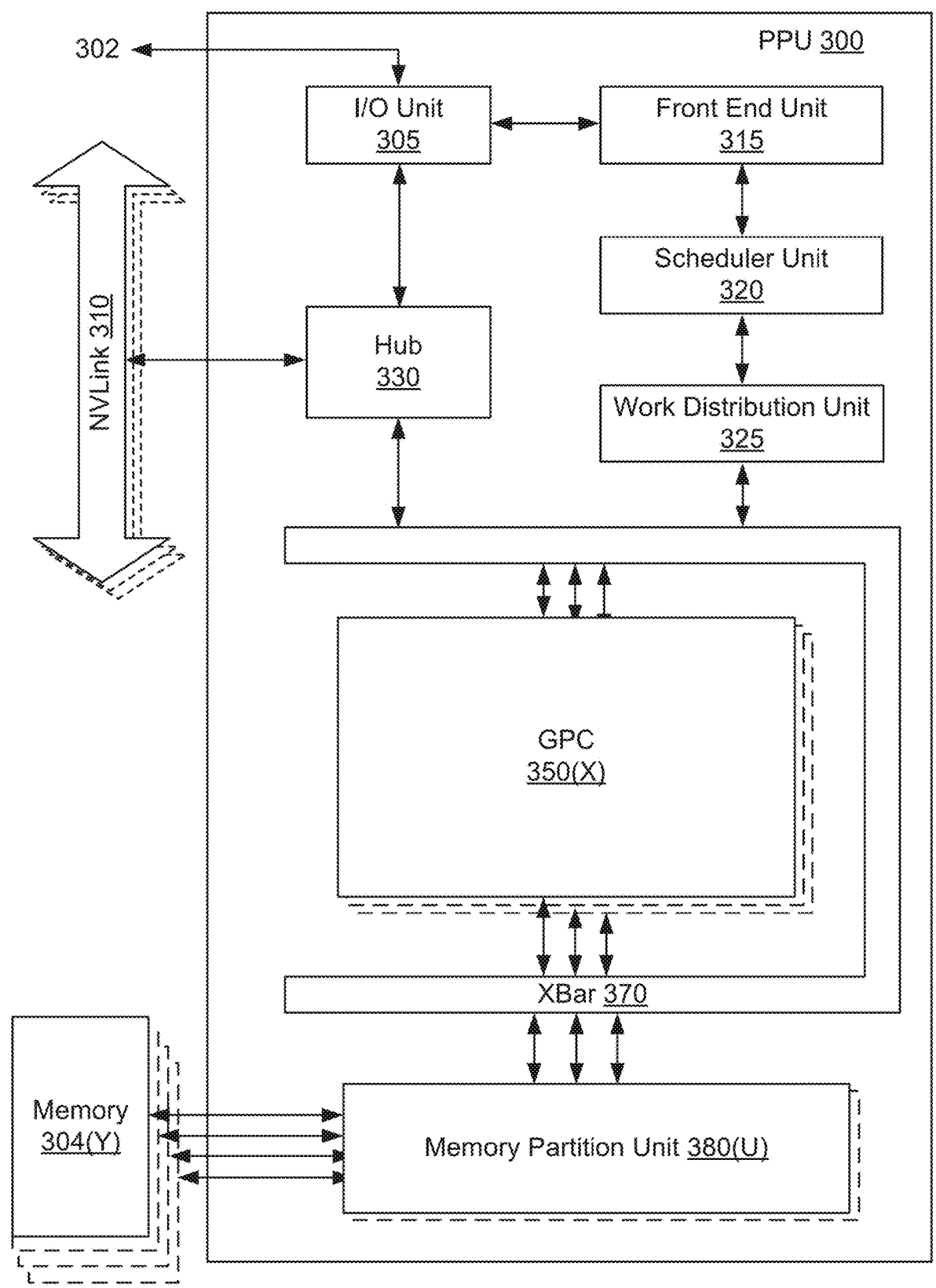
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
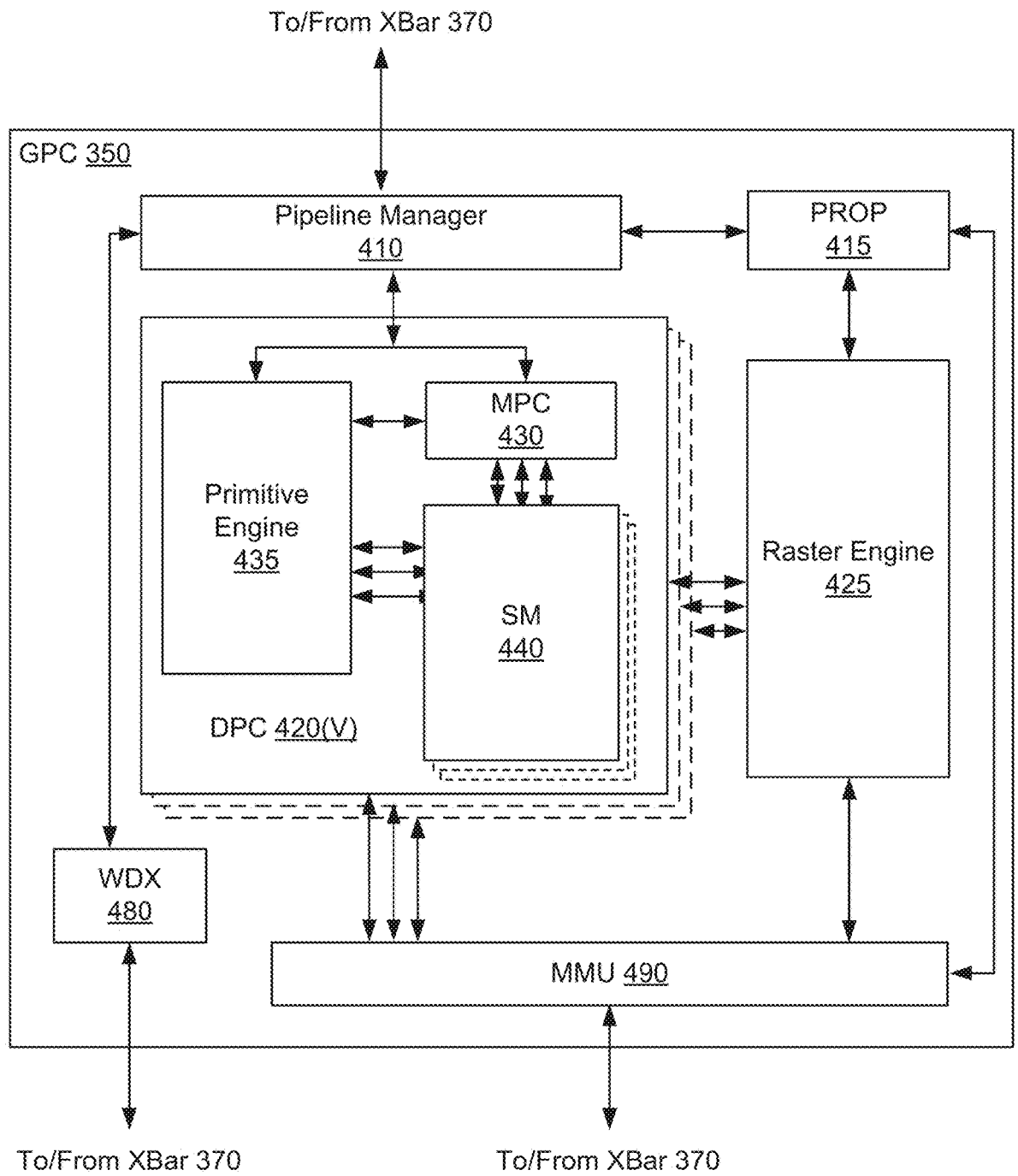
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
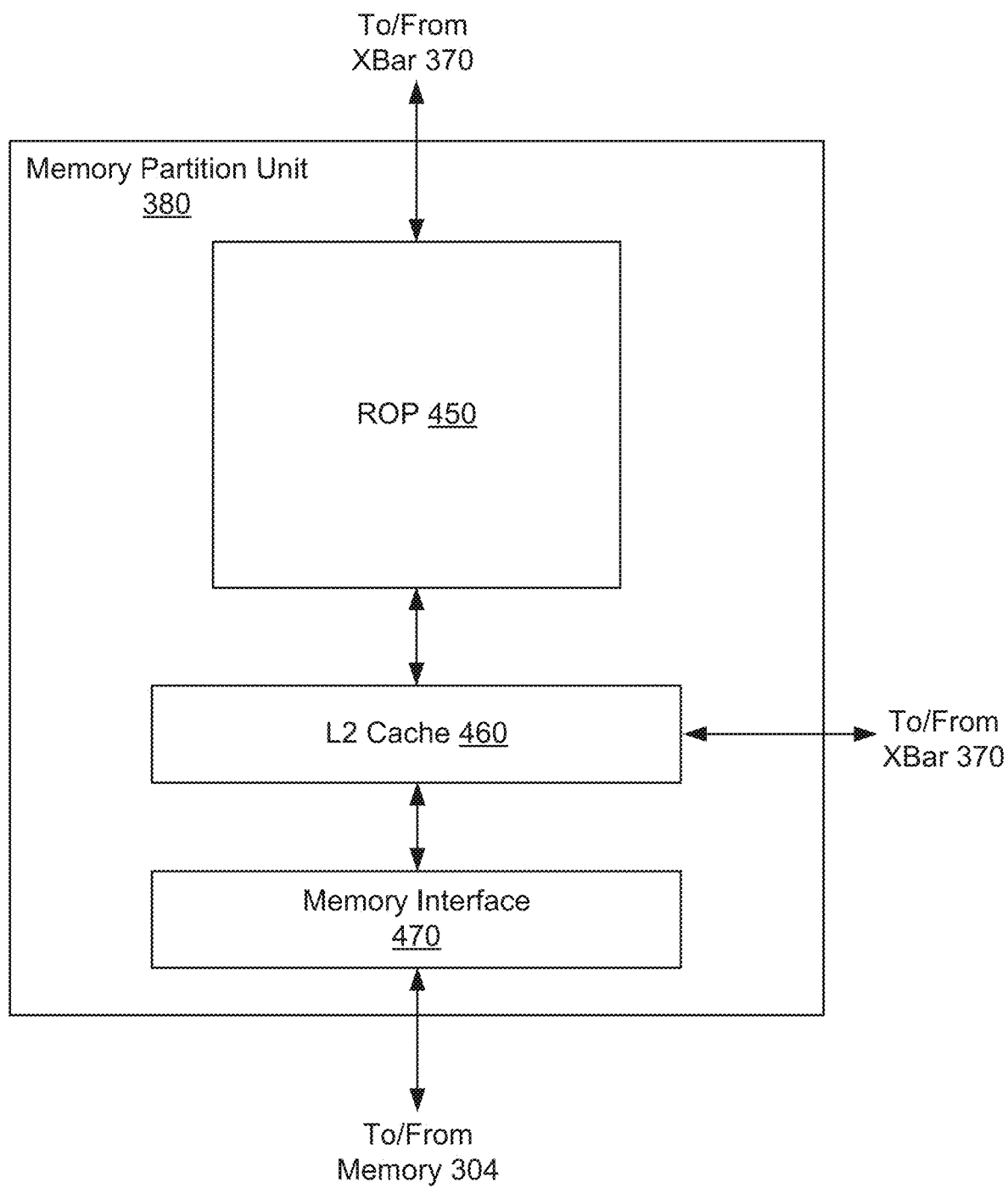
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
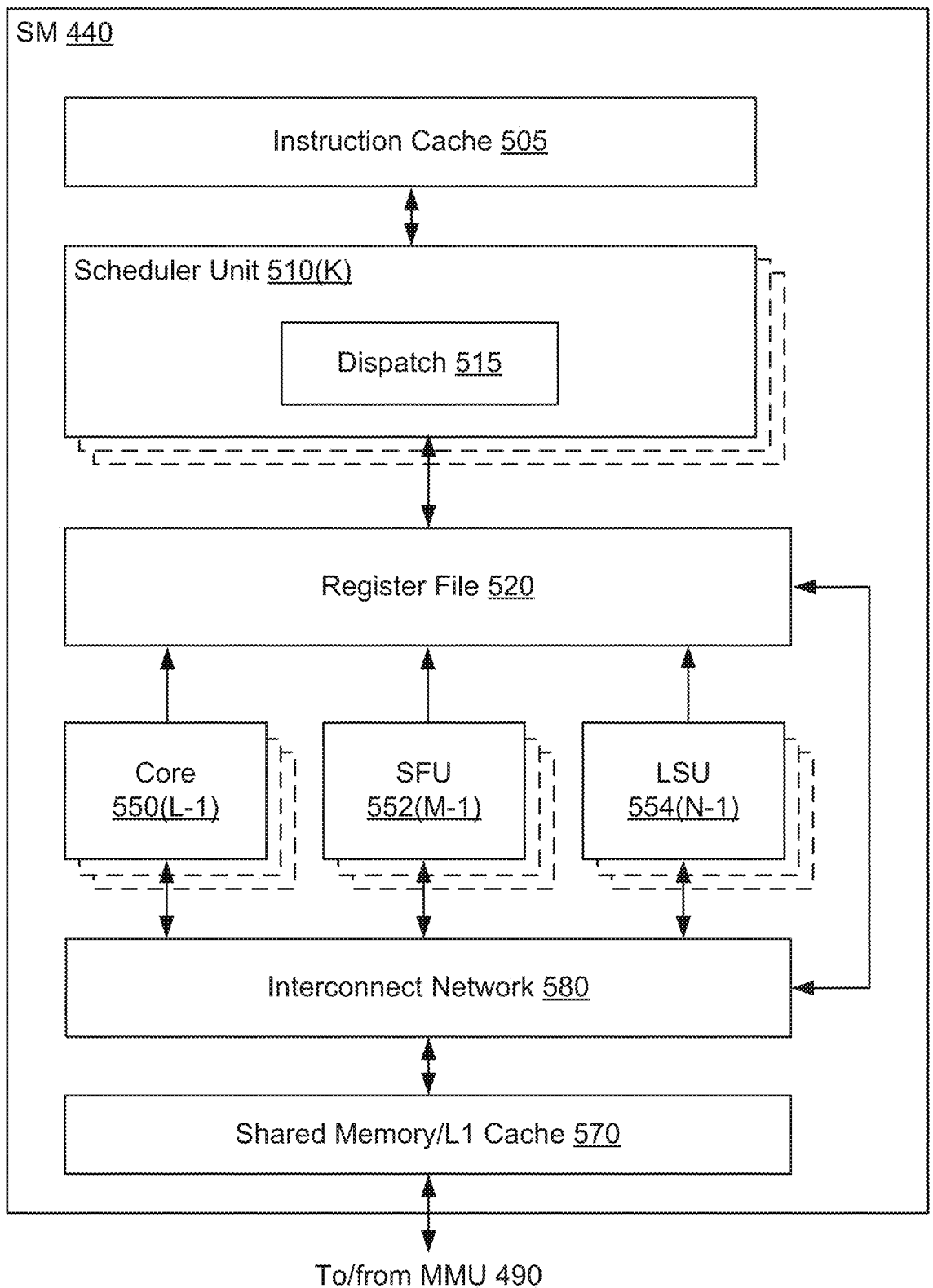
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( )) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
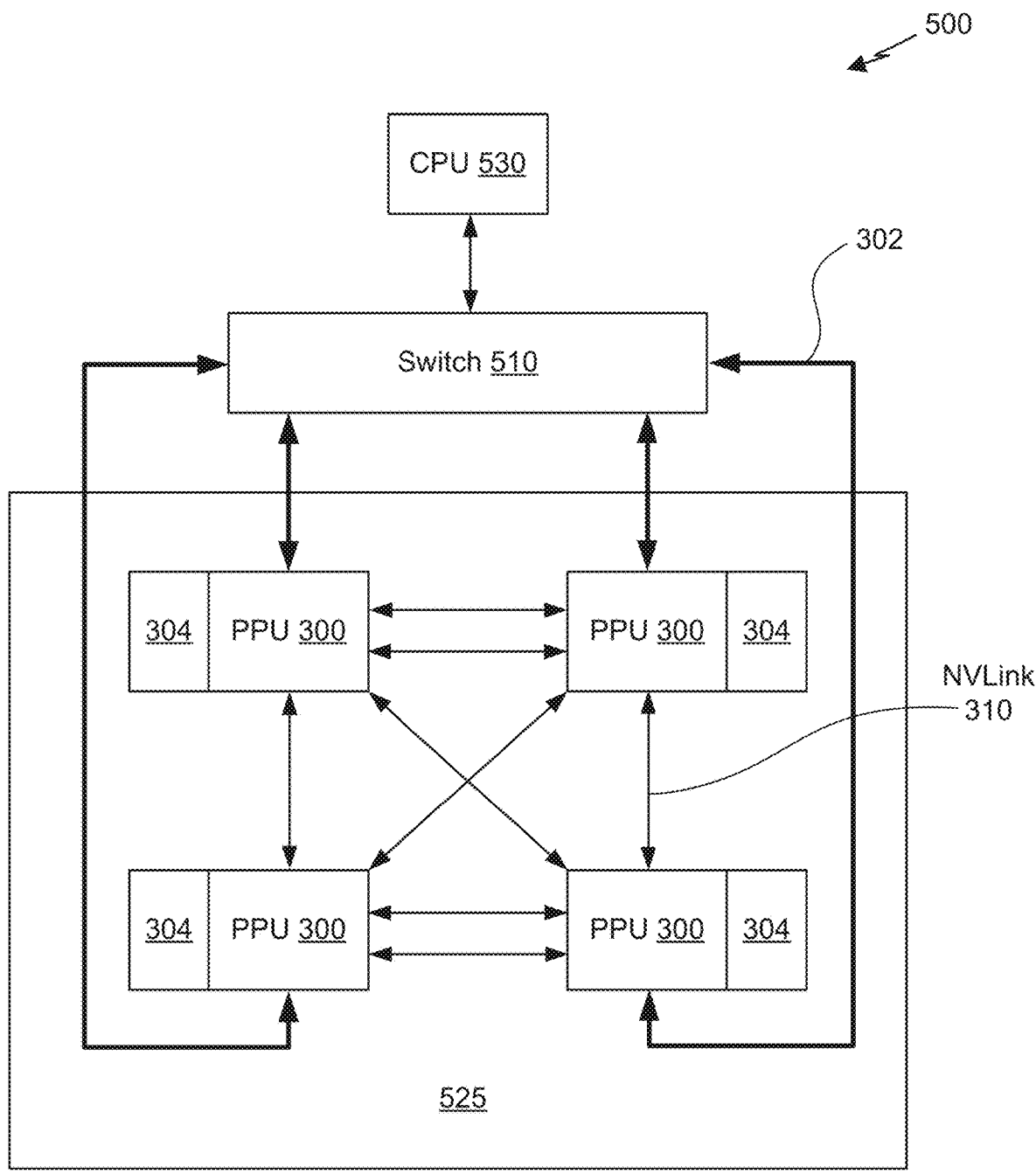
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement motion adaptive rendering, described in the method 110 of FIG. 1A. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
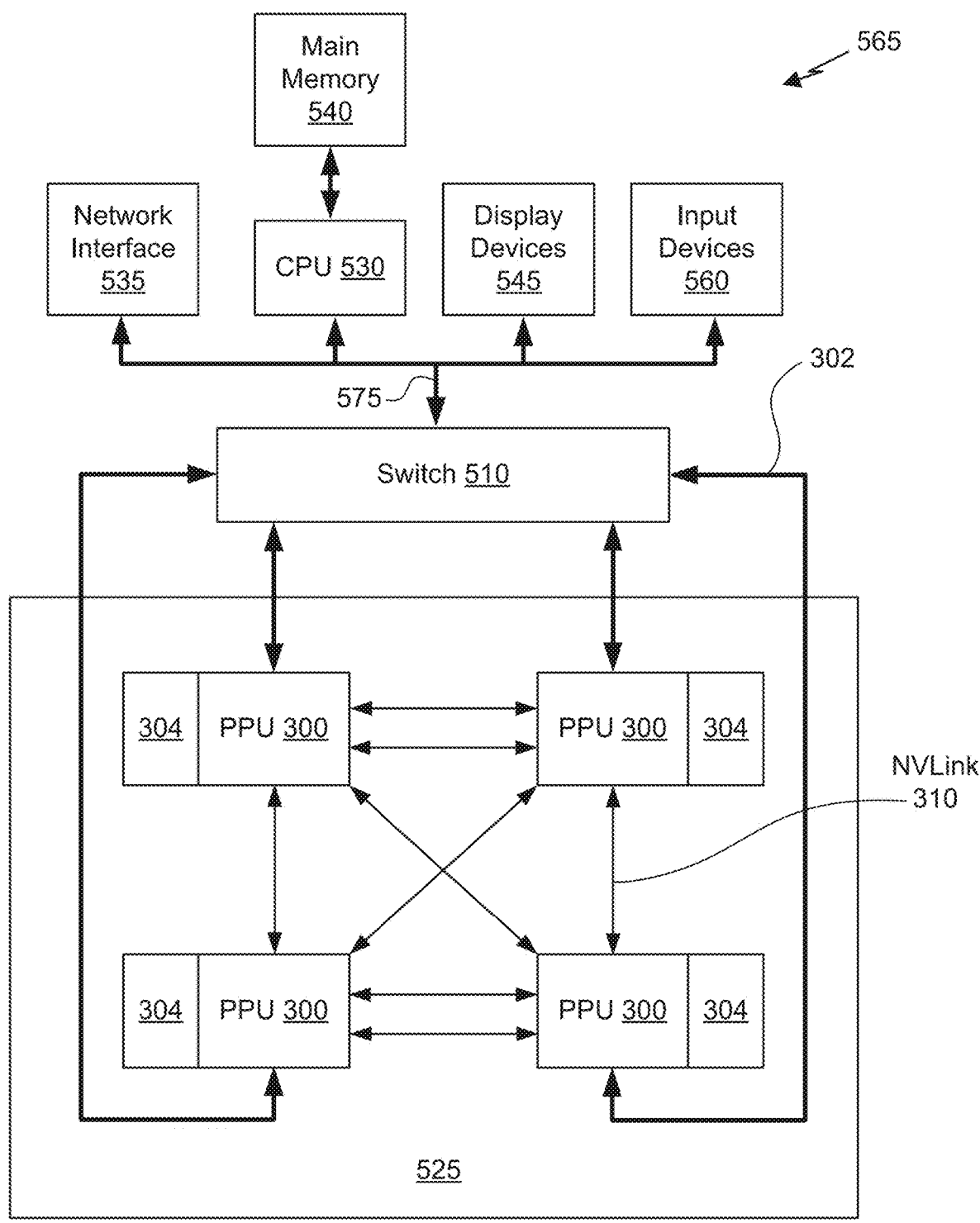
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured implement motion adaptive rendering, described in the method 110 shown in FIG. 1A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
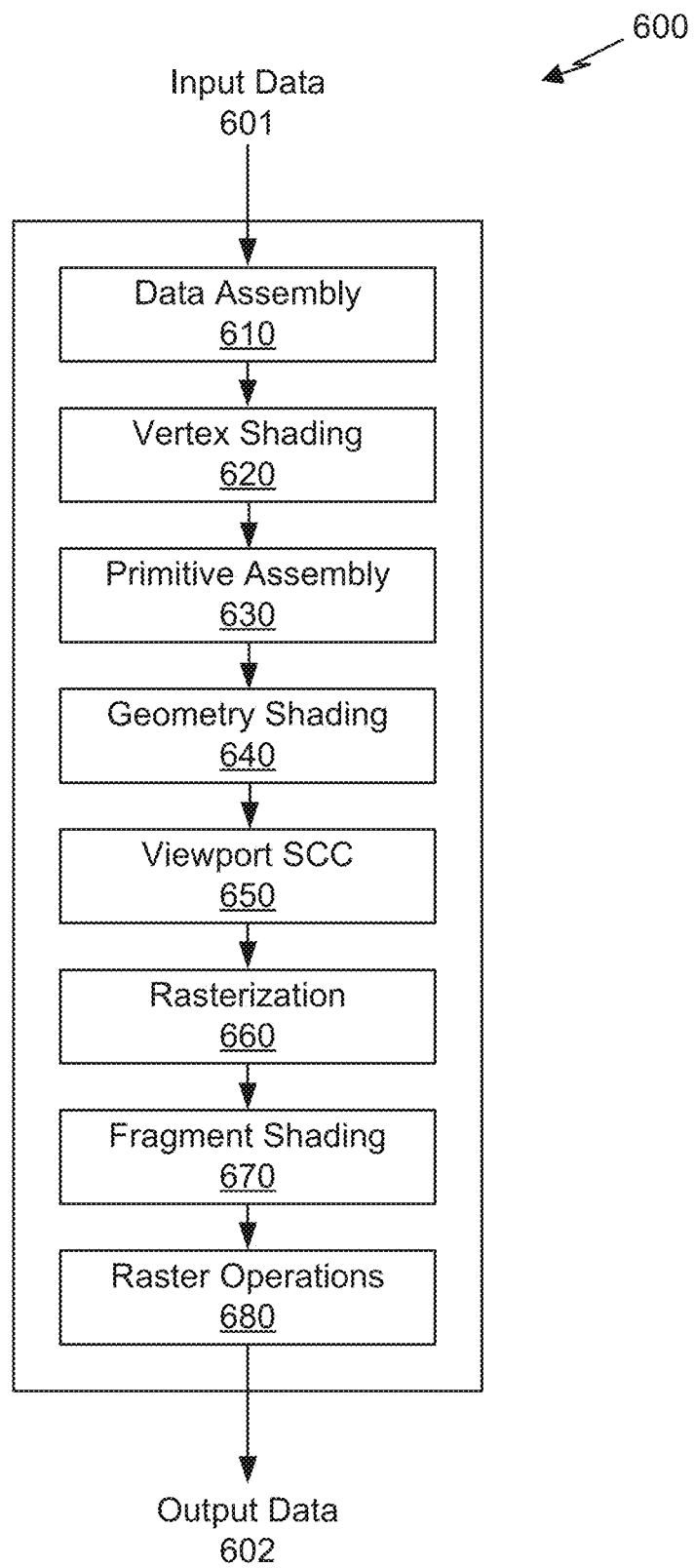
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for motion adaptive rendering, comprising:
    calculating a horizontal motion value for a first region of a frame, wherein the frame includes multiple regions;
    calculating a vertical motion value for the first region;
    comparing the horizontal motion value to a first plurality of threshold values to determine a horizontal shading dimension,
        wherein the horizontal shading dimension has a first value when the horizontal motion value is less than all of the first plurality of threshold values,
        the horizontal shading dimension has a second value when the horizontal motion value is greater than all of the first plurality of threshold values, and
        the horizontal shading dimension has a third value when the horizontal motion value is less than some of the first plurality of threshold values and greater than some of the first plurality of threshold values;
    comparing the vertical motion value to a second plurality of threshold values to determine a vertical shading dimension,
        wherein the vertical shading dimension has a fourth value when the vertical motion value is less than all of the second plurality of threshold values,
        the vertical shading dimension has a fifth value when the vertical motion value is greater than all of the second plurality of threshold values, and
        the vertical shading dimension has a sixth value when the vertical motion value is less than some of the second plurality of threshold values and greater than some of the second plurality of threshold values;
    subdividing the first region into a plurality of pixel blocks, wherein each pixel block has a number of pixels along the horizontal dimension of the pixel block that corresponds to the horizontal shading dimension and each pixel block has a number of pixels along the vertical dimension of the pixel block that corresponds to the vertical shading dimension; and
    rendering a graphics primitive by assigning a shading value to each pixel in at least one of the pixel blocks that is at least partially covered by the graphics primitive.

2. The computer-implemented method of claim 1, wherein the first plurality of threshold values is the same as the second plurality of threshold values.

3. The computer-implemented method of claim 2, wherein the first value is the same as the fourth value, the second value is the same as the fifth value, and the third value is the same as the sixth value.

4. The computer-implemented method of claim 1, wherein the horizontal motion value and the vertical motion value are calculated according to optical flow of color image data between two frames rendered immediately prior to the frame.

5. The computer-implemented method of claim 1, wherein the horizontal motion value and the vertical motion value are calculated according to a camera position change or object position change between an immediately prior frame and the frame.

6. The computer-implemented method of claim 1, further comprising:
    computing content variation for the first region based on an immediate previously rendered frame; and
    modifying the first plurality of threshold values and the second plurality of threshold values based on the content variation.

7. The computer-implemented of claim 6, wherein modifying the first plurality of threshold values and the second plurality of threshold values increases at least one of the horizontal shading dimension and the vertical shading dimension when the content variation indicates a low variation of color and luminance.

8. The computer-implemented of claim 6, wherein modifying the first plurality of threshold values and the second plurality of threshold values decreases at least one of the horizontal shading dimension and the vertical shading dimension when the content variation indicates a high variation of color and luminance.

9. A system, comprising:
a processor configured to:
calculate a horizontal motion value for a first region of a frame, wherein the frame includes multiple regions;
calculate a vertical motion value for the first region;
compare the horizontal motion value to a first plurality of threshold values to determine a horizontal shading dimension,
wherein the horizontal shading dimension has a first value when the horizontal motion value is less than all of the first plurality of threshold values,
the horizontal shading dimension has a second value when the horizontal motion value is greater than all of the first plurality of threshold values, and
the horizontal shading dimension has a third value when the horizontal motion value is less than some of the first plurality of threshold values and greater than some of the first plurality of threshold values;
compare the vertical motion value to a second plurality of threshold values to determine a vertical shading dimension,
wherein the vertical shading dimension has a fourth value when the vertical motion value is less than all of the second plurality of threshold values,
the vertical shading dimension has a fifth value when the vertical motion value is greater than all of the second plurality of threshold values, and
the vertical shading dimension has a sixth value when the vertical motion value is less than some of the second plurality of threshold values and greater than some of the second plurality of threshold values;
subdivide the first region into a plurality of pixel blocks, wherein each pixel block has a number of pixels along the horizontal dimension of the pixel block that corresponds to the horizontal shading dimension and each pixel block has a number of pixels along the vertical dimension of the pixel block that corresponds to the vertical shading dimension; and
render a graphics primitive by assigning a shading value to each pixel in at least one of the pixel blocks that is at least partially covered by the graphics primitive.

10. The system of claim 9, wherein the first plurality of threshold values is the same as the second plurality of threshold values.

11. The system of claim 10, wherein the first value is the same as the fourth value, the second value is the same as the fifth value, and the third value is the same as the sixth value.

12. The system of claim 9, wherein the horizontal motion value and the vertical motion value are calculated according to optical flow of color image data between two frames rendered immediately prior to the frame.

13. The system of claim 9, wherein the horizontal motion value and the vertical motion value are calculated according to a camera position change or object position change between an immediately prior frame and the frame.

14. The system of claim 9, further the processor is further configured to:
compute content variation for the first region based on an immediate previously rendered frame; and
modify the first plurality of threshold values and the second plurality of threshold values based on the content variation.

15. The system of claim 14, wherein modifying the first plurality of threshold values and the second plurality of threshold values increases at least one of the horizontal shading dimension and the vertical shading dimension when the content variation indicates a low variation of color and luminance.

16. The system of claim 14, wherein modifying the first plurality of threshold values and the second plurality of threshold values decreases at least one of the horizontal shading dimension and the vertical shading dimension when the content variation indicates a high variation of color and luminance.

17. A non-transitory computer-readable media storing computer instructions for motion adaptive rendering that, when executed by one or more processors, cause the one or more processors to perform the steps of:
calculating a horizontal motion value for a first region of a frame, wherein the frame includes multiple regions;
calculating a vertical motion value for the first region;
comparing the horizontal motion value to a first plurality of threshold values to determine a horizontal shading dimension,
wherein the horizontal shading dimension has a first value when the horizontal motion value is less than all of the first plurality of threshold values,
the horizontal shading dimension has a second value when the horizontal motion value is greater than all of the first plurality of threshold values, and
the horizontal shading dimension has a third value when the horizontal motion value is less than some of the first plurality of threshold values and greater than some of the first plurality of threshold values;
comparing the vertical motion value to a second plurality of threshold values to determine a vertical shading dimension,
wherein the vertical shading dimension has a fourth value when the vertical motion value is less than all of the second plurality of threshold values,
the vertical shading dimension has a fifth value when the vertical motion value is greater than all of the second plurality of threshold values, and
the vertical shading dimension has a sixth value when the vertical motion value is less than some of the second plurality of threshold values and greater than some of the second plurality of threshold values;
subdividing the first region into a plurality of pixel blocks, wherein each pixel block has a number of pixels along the horizontal dimension of the pixel block that corresponds to the horizontal shading dimension and each pixel block has a number of pixels along the vertical dimension of the pixel block that corresponds to the vertical shading dimension; and
rendering a graphics primitive by assigning a shading value to each pixel in at least one of the pixel blocks that is at least partially covered by the graphics primitive.

18. The non-transitory computer-readable media of claim 17, wherein the first plurality of threshold values is the same as the second plurality of threshold values.

19. The non-transitory computer-readable media of claim 18, wherein the first value is the same as the fourth value, the second value is the same as the fifth value, and the third value is the same as the sixth value.

20. The non-transitory computer-readable media of claim 17, wherein the horizontal motion value and the vertical motion value are calculated according to optical flow of color image data between two frames rendered immediately prior to the frame.

* * * * *